(12) United States Patent
Suzuki et al.

(10) Patent No.: US 12,104,598 B2
(45) Date of Patent: *Oct. 1, 2024

(54) ECCENTRIC SLIDING ASSEMBLY WITH A PLURALITY OF DYNAMIC PRESSURE GENERATION MECHANISMS

(71) Applicant: EAGLE INDUSTRY CO., LTD., Tokyo (JP)

(72) Inventors: Hiroshi Suzuki, Tokyo (JP); Yuichiro Tokunaga, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/012,857

(22) PCT Filed: Jul. 1, 2021

(86) PCT No.: PCT/JP2021/024938
§ 371 (c)(1),
(2) Date: Dec. 23, 2022

(87) PCT Pub. No.: WO2022/009766
PCT Pub. Date: Jan. 13, 2022

(65) Prior Publication Data
US 2023/0258183 A1    Aug. 17, 2023

(30) Foreign Application Priority Data
Jul. 6, 2020   (JP) .................................. 2020-116355

(51) Int. Cl.
*F04C 29/00*   (2006.01)
*F01C 19/00*   (2006.01)
(Continued)

(52) U.S. Cl.
CPC ............ *F04C 29/00* (2013.01); *F01C 19/005* (2013.01); *F04C 18/0215* (2013.01);
(Continued)

(58) Field of Classification Search
CPC .... F04C 29/00; F04C 18/0215; F04C 27/008; F04C 29/02; F04C 2240/54; F01C 19/005; F16C 17/045
See application file for complete search history.

(56) References Cited

U.S. PATENT DOCUMENTS

| | | |
|---|---|---|
| 1,876,515 A | 9/1932 | Emmet et al. |
| 2,244,450 A | 6/1941 | Erni |
| (Continued) | | |

FOREIGN PATENT DOCUMENTS

| | | | |
|---|---|---|---|
| CN | 1245552 | 2/2000 | ............... F16J 15/34 |
| CN | 2460801 | 11/2001 | ............... F16J 15/40 |
| (Continued) | | | |

OTHER PUBLICATIONS

U.S. Appl. No. 18/012,853, filed Dec. 23, 2022, Suzuki.
(Continued)

*Primary Examiner* — Mary Davis
(74) *Attorney, Agent, or Firm* — HAYES SOLOWAY P.C.

(57) ABSTRACT

Provided is a sliding component capable of stably reducing the frictional resistance of a sliding surface entailing eccentric rotation. A sliding component has a sliding surface relatively sliding with eccentric rotation, in which the sliding surface includes a land and a plurality of dynamic pressure generation mechanisms arranged in a circumferential direction, the dynamic pressure generation mechanism includes a shallow groove portion and a deep groove portion, and the shallow groove portion surrounds a circumference of the deep groove portion and communicates with the deep groove portion.

7 Claims, 11 Drawing Sheets

(51) Int. Cl.
  *F04C 18/02* (2006.01)
  *F04C 27/00* (2006.01)
  *F04C 29/02* (2006.01)
  *F16C 17/04* (2006.01)

(52) U.S. Cl.
  CPC ............ *F04C 27/008* (2013.01); *F04C 29/02* (2013.01); *F16C 17/045* (2013.01); *F04C 2240/54* (2013.01)

(56) References Cited

U.S. PATENT DOCUMENTS

| | | | | |
|---|---|---|---|---|
| 3,380,040 A * | 4/1968 | Liggett | ................ | F16C 17/045 384/100 |
| 3,383,116 A | 5/1968 | Carter | ............................ | 277/96 |
| 3,443,813 A | 5/1969 | Carlsson | ............... | F16J 15/3416 |
| 3,527,465 A | 9/1970 | Guinard | | |
| 3,675,935 A | 7/1972 | Ludwig | ................ | F16J 15/342 |
| 3,695,789 A | 10/1972 | Jansson | ............... | F01C 21/003 |
| 3,704,019 A | 11/1972 | McHugh | ...................... | 277/400 |
| 3,782,737 A | 1/1974 | Ludwig et al. | ................. | 272/27 |
| 4,056,478 A | 11/1977 | Capelli | ..................... | C01M 5/00 |
| 4,071,253 A | 1/1978 | Heinen et al. | ..................... | 277/3 |
| 4,523,764 A | 6/1985 | Albers et al. | ..................... | 277/3 |
| 4,772,188 A | 9/1988 | Kimura et al. | ......... | F04C 18/04 |
| 4,874,302 A | 10/1989 | Kobayashi et al. | .... | F04C 18/04 |
| 4,889,348 A | 12/1989 | Amundson | .................. | 272/306 |
| 5,071,141 A | 12/1991 | Lai et al. | | |
| 5,092,612 A | 3/1992 | Victor et al. | ................. | 277/96.1 |
| 5,174,584 A | 12/1992 | Lahrman | ...................... | 277/400 |
| 5,180,173 A | 1/1993 | Kimura et al. | | |
| 5,224,714 A | 7/1993 | Kimura | ......................... | 277/400 |
| 5,316,455 A | 5/1994 | Yoshimura | .......... | F04C 29/0021 |
| 5,447,316 A | 9/1995 | Matsui | ......................... | 277/400 |
| 5,556,111 A | 9/1996 | Sedy | ............................ | 277/400 |
| 5,558,341 A | 9/1996 | McNickle | .................... | 277/400 |
| 5,769,604 A | 6/1998 | Gardner et al. | ........... | 415/170.1 |
| 5,834,094 A | 11/1998 | Etsion et al. | ................. | 428/156 |
| 5,947,481 A | 9/1999 | Young | ........................... | 277/400 |
| 5,952,080 A | 9/1999 | Etsion et al. | ................. | 428/156 |
| 6,002,100 A | 12/1999 | Etsion | ...................... | 219/121.71 |
| 6,046,430 A | 4/2000 | Etsion | ...................... | 219/121.71 |
| 6,135,458 A | 10/2000 | Fuse | ............................. | 277/401 |
| 6,152,452 A | 11/2000 | Wang | ........................... | 277/400 |
| 6,213,473 B1 | 4/2001 | Lebeck | | |
| 6,446,976 B1 | 9/2002 | Key et al. | ................ | F16J 15/34 |
| 6,692,006 B2 | 2/2004 | Holder | ......................... | 277/346 |
| 6,726,213 B2 | 4/2004 | Wang | ........................... | 277/400 |
| 7,258,346 B2 | 8/2007 | Tejima | ......................... | 277/399 |
| 7,377,518 B2 | 5/2008 | Lai | ............................. | 277/400 |
| 7,758,051 B2 | 7/2010 | Roberts-Haritonov | ........ | 277/401 |
| 7,931,277 B2 | 4/2011 | Garrison | ...................... | 277/399 |
| 8,100,405 B2 | 1/2012 | Kneeland et al. | ............ | 277/355 |
| 8,342,534 B2 | 1/2013 | Vasagar | ........................ | 277/399 |
| 8,585,060 B2 | 11/2013 | Oshii et al. | .................... | 277/401 |
| 9,151,390 B2 | 10/2015 | Hosoe | .................... | F16J 15/3412 |
| 9,169,931 B2 | 10/2015 | Tokunaga | ............... | F16J 15/34 |
| 9,228,660 B2 | 1/2016 | Hosoe | .................... | F16J 15/3412 |
| 9,353,867 B2 | 5/2016 | Itadani et al. | ........ | F16J 15/3448 |
| 9,494,239 B2 | 11/2016 | Hosoe | .................... | F16J 15/342 |
| 9,512,923 B2 | 12/2016 | Inone et al. | ............ | F16J 15/34 |
| 9,574,666 B2 | 2/2017 | Ferris | .................... | F16J 15/3412 |
| 9,574,667 B2 | 2/2017 | Takahashi et al. | .... | F16J 15/342 |
| 9,587,745 B2 | 3/2017 | Itadani | ................. | F16J 15/348 |
| 9,772,037 B2 | 9/2017 | Itadani et al. | ........ | F16J 15/3412 |
| 9,784,372 B2 | 10/2017 | Iguchi | .................... | F16J 15/342 |
| 9,863,473 B2 | 1/2018 | Hosoe et al. | ......... | F16C 33/741 |
| 9,958,010 B2 | 5/2018 | Itadani | ................... | F16C 33/74 |
| 9,982,715 B2 | 5/2018 | Gorges et al. | ........ | F16C 33/201 |
| 10,054,230 B2 | 8/2018 | Katori et al. | ........ | F16J 15/3412 |
| 10,132,411 B2 | 11/2018 | Hosoe et al. | ......... | F16J 15/164 |
| 10,337,620 B2 | 7/2019 | Tokunaga et al. | ..... | F16J 15/342 |
| 10,443,737 B2 | 10/2019 | Itadani | ................... | F16J 15/342 |
| 10,495,228 B2 | 12/2019 | Itadani | ................... | F16J 15/3412 |
| 10,865,883 B2 | 12/2020 | Seki et al. | ........... | F16J 15/3404 |
| 11,053,975 B2 | 7/2021 | Imura | .................... | F16C 17/045 |
| 11,221,071 B2 | 1/2022 | Sasaki et al. | ............ | F16J 15/34 |
| 11,248,706 B2 | 2/2022 | Imura | .................... | F16C 33/74 |
| 11,320,052 B2 | 5/2022 | Imura et al. | ............ | F16J 15/34 |
| 11,815,184 B2 | 11/2023 | Inoue et al. | ............ | F16J 15/34 |
| 11,821,521 B2 | 11/2023 | Imura et al. | ............ | F16J 15/34 |
| 11,913,454 B2 * | 2/2024 | Suzuki | ................. | F04C 29/00 |
| 2002/0014743 A1 | 2/2002 | Zheng | ........................... | 277/358 |
| 2002/0093141 A1 | 7/2002 | Wang | ........................ | F16J 15/34 |
| 2002/0158416 A1 | 10/2002 | Hosanna | ............... | F16J 15/3404 |
| 2003/0041680 A1 | 3/2003 | Saito et al. | ............ | F02N 15/06 |
| 2004/0080112 A1 | 4/2004 | Tejima | ................. | F16J 15/3436 |
| 2005/0135957 A1* | 6/2005 | Park | .................... | F04C 18/0215 418/55.6 |
| 2005/0212217 A1 | 9/2005 | Tejima | ......................... | 277/399 |
| 2005/0263963 A1 | 12/2005 | Lai | ............................. | 277/399 |
| 2007/0228664 A1 | 10/2007 | Anand | ................. | F16J 15/3496 |
| 2007/0267820 A1 | 11/2007 | Martin | ................. | F16J 15/3496 |
| 2007/0275267 A1 | 11/2007 | Sabouni | ............... | F16J 15/3496 |
| 2007/0296156 A1 | 12/2007 | Yanagisawa et al. | ........ | 277/352 |
| 2008/0050260 A1 | 2/2008 | Iwanami et al. | ............. | 418/55.6 |
| 2008/0100001 A1 | 5/2008 | Flaherty | | |
| 2009/0200749 A1 | 8/2009 | Teshima | ............... | F16J 15/3484 |
| 2011/0194966 A1 | 8/2011 | Takeuchi | ............ | F04B 18/0215 |
| 2011/0215531 A1 | 9/2011 | Tokunaga et al. | ............ | 277/399 |
| 2011/0215535 A1 | 9/2011 | Vasagar | ........................ | 277/559 |
| 2011/0305871 A1 | 12/2011 | Tabuchi | ............... | F16J 15/3284 |
| 2012/0018957 A1 | 1/2012 | Watanabe | ................ | F16J 15/34 |
| 2012/0217705 A1 | 8/2012 | Hosoe | ........................... | 277/400 |
| 2013/0168928 A1 | 7/2013 | Schrufer | ............... | C10M 103/02 |
| 2013/0209011 A1 | 8/2013 | Tokunaga | | |
| 2013/0323105 A1 | 12/2013 | Chao et al. | ........... | F04C 29/028 |
| 2014/0159314 A1 | 6/2014 | Hosoe | ...................... | F16J 15/34 |
| 2014/0197600 A1 | 7/2014 | Hosoe | ...................... | F16J 15/342 |
| 2014/0217676 A1 | 8/2014 | Hosoe et al. | ...................... | 27/350 |
| 2014/0294330 A1 | 10/2014 | Tokunaga | ............... | F16C 17/04 |
| 2014/0319776 A1 | 10/2014 | Theike et al. | | |
| 2015/0036955 A1 | 2/2015 | Nomura et al. | ........ | F16C 33/20 |
| 2015/0115540 A1 | 4/2015 | Tokunaga | ................ | F16J 15/34 |
| 2015/0123350 A1 | 5/2015 | Itadani | ................. | F16J 15/3412 |
| 2015/0167847 A1 | 6/2015 | Tokunaga | | |
| 2015/0184752 A1 | 7/2015 | Itadani | ................. | F16J 15/3412 |
| 2015/0345642 A1 | 12/2015 | Haas | .................... | F16J 15/3496 |
| 2015/0377297 A1 | 12/2015 | Tokunaga et al. | .... | F16C 33/748 |
| 2015/0377360 A1 | 12/2015 | Itadani | ................. | F16C 15/3448 |
| 2016/0033045 A1 | 2/2016 | Itadani et al. | ...... | F16J 15/3412 |
| 2016/0097457 A1 | 4/2016 | Sun et al. | ............ | F16J 15/3412 |
| 2017/0089467 A1 | 3/2017 | Young | ................... | F01D 11/003 |
| 2017/0146014 A1 | 5/2017 | Ohta et al. | .......... | F04C 29/0021 |
| 2017/0241549 A1 | 8/2017 | Itadani | ................. | F16J 15/3412 |
| 2017/0261107 A1 | 9/2017 | Martin | ................. | F16J 15/3452 |
| 2017/0350407 A1 | 12/2017 | Yamamoto et al. | .. | F04D 29/046 |
| 2018/0017163 A1 | 1/2018 | Hosoe et al. | ......... | F16J 15/164 |
| 2018/0073394 A1 | 3/2018 | Tokunaga et al. | ...... | F01D 25/18 |
| 2018/0112711 A1 | 4/2018 | Itadani | ................. | F16J 15/363 |
| 2018/0128377 A1 | 5/2018 | Tukunaga et al. | ..... | F16J 15/342 |
| 2018/0128378 A1 | 5/2018 | Tokunaga et al. | ..... | F16J 15/342 |
| 2018/0135699 A1 | 5/2018 | Tokunaga et al. | ...... | F16C 33/80 |
| 2018/0172162 A1 | 6/2018 | Tokunaga et al. | ..... | F16J 15/34 |
| 2018/0195618 A1 | 7/2018 | Itadani et al. | ........ | F16J 15/3416 |
| 2018/0299015 A1 | 10/2018 | Itadani | ................. | F16J 15/3448 |
| 2019/0169988 A1 | 6/2019 | Tokunaga et al. | ...... | F01C 19/12 |
| 2019/0170257 A1 | 6/2019 | Hosoe et al. | ......... | F16J 15/3412 |
| 2019/0285115 A1 | 9/2019 | Negishi et al. | ........ | F16C 17/045 |
| 2019/0301522 A1 | 10/2019 | Negishi et al. | ......... | F16C 17/02 |
| 2019/0331162 A1 | 10/2019 | Negishi | ................ | F16J 15/34 |
| 2020/0141444 A1* | 5/2020 | Thatte | ................. | F16C 17/045 |
| 2020/0224722 A1 | 7/2020 | Imura | .................... | F16C 33/743 |
| 2020/0224768 A1 | 7/2020 | Imura | .................... | F16J 15/3412 |
| 2020/0240470 A1 | 7/2020 | Sorgenti | ............... | F16J 15/3212 |
| 2020/0332901 A1 | 10/2020 | Imura | .................... | F16J 15/3412 |
| 2021/0041026 A1 | 2/2021 | Imura | .................... | F16J 15/3424 |
| 2021/0048062 A1 | 2/2021 | Masumi et al. | ....... | F16C 17/102 |
| 2021/0048106 A1 | 2/2021 | Imura et al. | ......... | F16J 15/3412 |
| 2021/0080009 A1 | 3/2021 | Kimura et al. | ...... | F16J 15/3412 |
| 2021/0116030 A1 | 4/2021 | Kimura et al. | ........ | F16J 15/182 |
| 2021/0116032 A1 | 4/2021 | Kimura | ................. | F16J 15/188 |
| 2021/0355992 A1 | 11/2021 | Tokunaga | ............. | F16J 15/3412 |
| 2021/0364034 A1 | 11/2021 | Okada | ................... | F16J 15/342 |

(56) References Cited

U.S. PATENT DOCUMENTS

| | | | | |
|---|---|---|---|---|
| 2022/0056949 A1 | 2/2022 | Ikeda et al. | ............... | F16C 17/04 |
| 2022/0128151 A1 | 4/2022 | Tuk et al. | ............... | F16J 15/34 |
| 2023/0027772 A1 | 1/2023 | Suzuki et al. | ............ | F16C 17/02 |
| 2023/0258182 A1* | 8/2023 | Suzuki | ............... | F04C 18/0215 |
| | | | | 418/206.7 |

FOREIGN PATENT DOCUMENTS

| | | | | |
|---|---|---|---|---|
| CN | 1401924 | 3/2003 | ............... | F16J 15/16 |
| CN | 1529063 | 9/2004 | ............... | F16C 33/10 |
| CN | 1607710 | 4/2005 | ............... | F16C 17/08 |
| CN | 101644333 | 2/2010 | ............... | F16J 15/34 |
| CN | 201496542 | 6/2010 | ............... | F16J 15/16 |
| CN | 101793169 | 8/2010 | ............... | F01D 11/08 |
| CN | 101793324 | 8/2010 | ............... | F16J 15/16 |
| CN | 101861485 | 10/2010 | ............... | F16J 15/34 |
| CN | 203098871 | 7/2013 | ............... | F16J 15/34 |
| CN | 103557229 | 2/2014 | ............... | F16C 17/04 |
| CN | 103557334 | 2/2014 | ............... | F16J 15/34 |
| CN | 203641506 | 6/2014 | ............... | F16J 15/16 |
| CN | 104169622 | 11/2014 | ............... | F16J 15/34 |
| CN | 104321568 | 1/2015 | ............... | F16C 33/72 |
| CN | 104685273 | 6/2015 | ............... | F16J 15/34 |
| CN | 205244387 | 5/2016 | ............... | F16J 15/16 |
| CN | 106029294 | 10/2016 | ........... | B23K 26/364 |
| CN | 205877184 | 1/2017 | ............... | F16J 15/16 |
| CN | 205877198 | 1/2017 | ............... | F16J 15/34 |
| CN | 106439023 | 2/2017 | ............... | F16J 15/16 |
| CN | 107489770 | 12/2017 | ............... | F16J 15/34 |
| CN | 108131386 | 6/2018 | ............... | F16C 17/10 |
| CN | 109237042 | 1/2019 | ............... | F16J 15/34 |
| CN | 110770456 | 2/2020 | ............... | F16C 33/12 |
| CN | 110925426 | 3/2020 | ............... | F16J 15/16 |
| CN | 111656065 | 9/2020 | ............... | F16J 15/34 |
| DE | 3223703 | 6/1982 | ............... | F16J 15/34 |
| DE | 10048256 | 9/2000 | ............... | F16C 33/06 |
| DE | 102008038396 | 2/2010 | | |
| EP | 0369295 | 11/1988 | ............... | F16J 15/34 |
| EP | 0589514 | 9/1992 | ............... | B21J 5/12 |
| EP | 0518681 | 12/1992 | ............... | G11B 15/60 |
| EP | 0637706 | 8/1993 | ............... | F16J 15/34 |
| EP | 2138225 | 12/2009 | ............... | B01J 13/20 |
| EP | 2754931 | 7/2014 | ............... | F16J 15/34 |
| EP | 3112078 | 1/2017 | ........... | B23K 26/364 |
| EP | 3196516 | 7/2017 | ............... | F16J 15/34 |
| EP | 3217049 | 9/2017 | ............... | F16J 15/34 |
| EP | 3396186 | 10/2018 | ............... | F16C 33/10 |
| EP | 3575621 | 12/2019 | ............... | F16C 33/10 |
| EP | 3575643 | 12/2019 | ............... | F16J 15/34 |
| EP | 3650722 | 5/2020 | ............... | F16C 33/12 |
| FR | 2342440 | 9/1997 | ............... | F16J 15/34 |
| GB | 1509482 | 5/1978 | ............... | F16C 33/10 |
| GB | 2263952 | 8/1993 | ............... | F16J 15/34 |
| JP | S51-034974 | 3/1976 | | |
| JP | S52-143571 | 10/1977 | ............... | F16J 15/26 |
| JP | 57163770 | 10/1982 | ........... | F16J 15/3412 |
| JP | S59-195253 | 12/1984 | ............... | F16J 15/34 |
| JP | S59-195254 | 12/1984 | ............... | F16J 15/34 |
| JP | S61-8402 | 1/1986 | ............... | F01C 1/01 |
| JP | S63-134883 | 6/1988 | ............... | F04C 18/02 |
| JP | S63-190975 | 8/1988 | ............... | F16J 15/34 |
| JP | H02-16381 | 1/1990 | ............... | F04C 18/02 |
| JP | H02-236067 | 9/1990 | ............... | F16J 15/34 |
| JP | H02-136863 | 11/1990 | ............... | F16J 15/34 |
| JP | H04-50559 | 2/1992 | ............... | F16J 15/34 |
| JP | H04-337165 | 11/1992 | ............... | F16J 15/34 |
| JP | H04-362289 | 12/1992 | ............... | F04C 18/02 |
| JP | H05-60247 | 3/1993 | ............... | F16J 15/34 |
| JP | H05-296248 | 11/1993 | | |
| JP | H05-90049 | 12/1993 | ............... | F16J 15/34 |
| JP | H06-17941 | 1/1994 | ............... | F16J 15/34 |
| JP | H06-117547 | 4/1994 | ............... | F16J 15/34 |
| JP | H06-174107 | 6/1994 | ............... | F16J 15/34 |
| JP | H6200927 | 7/1994 | ............... | F16C 17/02 |
| JP | H06-323442 | 11/1994 | ............... | F16J 15/34 |
| JP | H06-105105 | 12/1994 | ............... | F16J 15/34 |
| JP | H07-43038 | 5/1995 | ............... | F16J 15/34 |
| JP | 9-89119 | 3/1997 | ............... | F16J 15/34 |
| JP | H09228968 | 9/1997 | ............... | F01C 17/06 |
| JP | 9-292034 | 11/1997 | ............... | F16J 15/34 |
| JP | H10-281299 | 10/1998 | ............... | F16J 15/34 |
| JP | H10-292867 | 11/1998 | | |
| JP | H10-339286 | 12/1998 | ............... | F04C 18/02 |
| JP | H11-132163 | 5/1999 | ............... | F04C 18/02 |
| JP | H11-287329 | 10/1999 | ............... | F16J 15/34 |
| JP | H11-303858 | 11/1999 | ............... | F16C 17/10 |
| JP | 3066367 | 5/2000 | ............... | F16J 15/34 |
| JP | 2001-12458 | 1/2001 | ............... | F16C 17/10 |
| JP | 2003-343730 | 12/2003 | ............... | F16J 15/22 |
| JP | 2004-360903 | 12/2004 | ............... | F16J 15/447 |
| JP | 2005-155894 | 6/2005 | ............... | F16C 17/04 |
| JP | 2005-180652 | 7/2005 | ............... | F16J 15/34 |
| JP | 2005-315391 | 11/2005 | | |
| JP | 2005-337503 | 12/2005 | ............... | F16J 15/34 |
| JP | 2006-9614 | 1/2006 | ............... | F04C 18/08 |
| JP | 2006-77899 | 3/2006 | ............... | F16J 15/34 |
| JP | 2006-90524 | 4/2006 | ............... | F16C 17/02 |
| JP | 2006-183702 | 7/2006 | ............... | F16C 17/04 |
| JP | 2006-316677 | 11/2006 | ............... | F04C 18/02 |
| JP | 2007-162045 | 6/2007 | | |
| JP | 2008-51018 | 3/2008 | ............... | F04C 18/02 |
| JP | 2008-51030 | 3/2008 | ............... | F04C 18/02 |
| JP | 2008-106940 | 5/2008 | ............... | F16J 15/34 |
| JP | 2011-74931 | 4/2011 | ............... | F16J 15/34 |
| JP | 2011-185292 | 9/2011 | ............... | F16J 15/34 |
| JP | 2012-2295 | 1/2012 | ............... | F16J 15/34 |
| JP | 2012-062534 | 3/2012 | | |
| JP | 2012-82794 | 4/2012 | ............... | F04C 18/02 |
| JP | 2012-122135 | 6/2012 | ............... | C25D 15/02 |
| JP | 2013-167216 | 8/2013 | ............... | F04C 18/02 |
| JP | 2013-213545 | 10/2013 | ............... | F16C 32/06 |
| JP | 2014-529052 | 10/2014 | | |
| JP | 2015-063647 | 4/2015 | | |
| JP | 2015-68330 | 4/2015 | ............... | F04C 29/00 |
| JP | 5693599 | 4/2015 | | |
| JP | 2015-183631 | 10/2015 | ............... | F04C 2/10 |
| JP | 2016-61208 | 4/2016 | ............... | F04C 18/02 |
| JP | 2016-80090 | 5/2016 | ............... | F16J 15/34 |
| JP | 5960145 | 7/2016 | ............... | F16J 15/34 |
| JP | WO2019049847 | 3/2019 | ............... | F16J 15/34 |
| JP | WO2020110922 | 6/2020 | ............... | F16J 15/34 |
| NL | 2022585 | 8/2020 | ............... | F16J 15/34 |
| WO | WO2011115073 | 9/2011 | ............... | F16J 15/34 |
| WO | WO2012046749 | 4/2012 | ............... | F16J 15/34 |
| WO | WO2013035503 | 3/2013 | ............... | F16J 15/34 |
| WO | WO2013053411 | 4/2013 | | |
| WO | WO2014061544 | 4/2014 | | |
| WO | WO2014148316 | 9/2014 | ............... | F16J 15/34 |
| WO | WO2014148317 | 9/2014 | ............... | F16J 15/34 |
| WO | WO2014174725 | 10/2014 | ............... | F16J 15/34 |
| WO | WO2015111707 | 7/2015 | ............... | F16J 15/18 |
| WO | WO2016035860 | 3/2016 | ............... | F16J 15/34 |
| WO | WO2006051702 | 5/2016 | ............... | F16J 15/34 |
| WO | WO2016167262 | 10/2016 | ............... | F16J 15/34 |
| WO | WO2016186015 | 11/2016 | ............... | F16J 15/34 |
| WO | WO2016186019 | 11/2016 | ............... | F16J 15/34 |
| WO | WO2016186020 | 11/2016 | ............... | F16J 15/34 |
| WO | WO2016203878 | 12/2016 | ............... | F16J 15/34 |
| WO | WO2017002774 | 1/2017 | ............... | F16J 15/34 |
| WO | WO2017061406 | 4/2017 | ............... | F16J 15/34 |
| WO | WO2018025629 | 2/2018 | ............... | F02B 55/02 |
| WO | WO2018092742 | 5/2018 | ............... | F16J 15/34 |
| WO | WO2018105505 | 6/2018 | ............... | F16J 33/12 |
| WO | WO2018139231 | 8/2018 | ............... | F16J 15/34 |
| WO | WO2020129846 | 6/2020 | ............... | F16C 17/04 |
| WO | WO2020130087 | 6/2020 | ............... | F16C 15/34 |
| WO | WO202112 | 6/2021 | ............... | F16J 15/18 |

OTHER PUBLICATIONS

U.S. Appl. No. 18/012,856, filed Dec. 23, 2022, Suzuki.
U.S. Appl. No. 18/013,513, filed Dec. 28, 2022, Suzuki.

(56) References Cited

OTHER PUBLICATIONS

U.S. Appl. No. 18/013,515, filed Dec. 28, 2022, Suzuki.
U.S. Appl. No. 18/013,520, filed Dec. 28, 2022, Suzuki.
International Search Report and Written Opinion issued in PCT/JP2021/024940, dated Aug. 10, 2021, with English translation, 13 pages.
International Search Report and Written Opinion issued in PCT/JP2021/024941, dated Sep. 14, 2021, with English translation, 13 pages.
International Search Report and Written Opinion issued in PCT/JP2021/024938, dated Aug. 3, 2021, with English translation
Intrnational Search Report and Written Opinion issued in PCT/JP2021/024945, dated Sep. 7, 2021, with Enlgish translation, 16 pages.
International Search Report and Written Opinion issued in PCT/JP2021/024943, dated Sep. 7, 2021, with English translation, 13 pages.
International Search Report and Written Opinion issued in PCT/JP2021/024944, dated Jul. 27, 2021, with English translation, 11 pages.
Official Action issued in related U.S. Appl. No. 18/012,853, dated Sep. 8, 2023, 11 pages.
Official Action issued in related U.S. Appl. No. 18/012,856, dated Sep. 11, 2023, 8 pages.
Notice of Allowance issued in related U.S. Appl. No. 18/013,515, dated Dec. 19, 2023, 10 pages.
Official Action issued in related U.S. Appl. No. 18/012,856, dated Feb. 2, 2024, 9 pages.
Official Action issued in related U.S. Appl. No. 18/013,513, dated Feb. 15, 2024, 9 pages.
Japanese Official Action issued in related application serial No. 2022-535275, dated Feb. 13, 2024, 8 pages.
Chinese Official Action issued in related Chinese Patent Application Serial No. 202180044553.5, dated Apr. 28, 2024, 13 pages with translation.
European Search Report issued in European Patent Application Serial No. 21837223.3, dated Jun. 25, 2024, 7 pages.
European Search Report issued in European Patent Application Serial No. 21837221.7, dated Jul. 2, 2024, 7 pages.
European Search Report issued in European Patent Application Serial No. 218336928.8, dated Jun. 25, 2024, 8 pages.
European Search Report issued in European Patent Application Serial No. 21837222.5, dated Jul. 12, 2024, 7 pages.
Official Action issued in related U.S. Appl. No. 18/013,520, dated Jul. 5, 2024, 8 pages.

\* cited by examiner

ECCENTRIC SLIDING ASSEMBLY WITH A PLURALITY OF DYNAMIC PRESSURE GENERATION MECHANISMS

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a fluid leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance of a sliding surface entailing eccentric rotation.

Solution to Problem

In order to solve the above problem, a sliding component according to the present invention has a sliding surface relatively sliding with eccentric rotation. The sliding surface includes a land and a plurality of dynamic pressure generation mechanisms arranged in a circumferential direction. Each of the dynamic pressure generation mechanisms includes a shallow groove portion and a deep groove portion deeper than the shallow groove portion. The shallow groove portion surrounds a circumference of the deep groove portion and communicates with the deep groove portion. According to the aforesaid feature of the present invention, the sealed fluid stored in the deep groove portion is stably supplied into the shallow groove portion in accordance with the direction of the relative movement of the shallow groove portion entailed by eccentric rotation. Accordingly, dynamic pressure is generated in the shallow groove portion and the sliding surfaces are slightly separated from each other. As a result, a fluid film is formed between the sliding surfaces, not only can lubricity be improved, but also the occurrence of cavitation can be suppressed. In this manner, the frictional resistance of the sliding surfaces during sliding can be stably reduced.

It may be preferable that the shallow groove portion surrounds the deep groove portion in an annular shape. According to this preferable configuration, dynamic pressure can be generated at any position over the entire circumference in the shallow groove portion in accordance with the direction of the relative movement of the shallow groove portion entailed by eccentric rotation.

It may be preferable that the shallow groove portion is formed in an annular shape, the deep groove portion is formed in a circular shape, and the shallow groove portion and the deep groove portion are concentrically formed. According to this preferable configuration, a uniform dynamic pressure can be generated in each shallow groove portion regardless of the direction of the relative movement of the shallow groove portion entailed by eccentric rotation.

It may be preferable that the shallow groove portion and the deep groove portion are partitioned by a step. According to this preferable that, a large amount of sealed fluid can be stored in the deep groove portion, and the fluid can be reliably supplied from the deep groove portion to the shallow groove portion.

It may be preferable that a depth of the deep groove portion is 10 times or more a depth of the shallow groove portion. According to this preferable configuration, a large amount of sealed fluid can be stored in the deep groove portion.

It may be preferable that the shallow groove portion is formed shallower on the land side than on the deep groove portion side. According to this preferable configuration, local negative pressure generation is unlikely in the shallow groove portion and the occurrence of cavitation can be suppressed. In addition, dynamic pressure can be effectively obtained in a wider eccentric rotation speed range.

DESCRIPTION OF EMBODIMENTS

Figure 1:
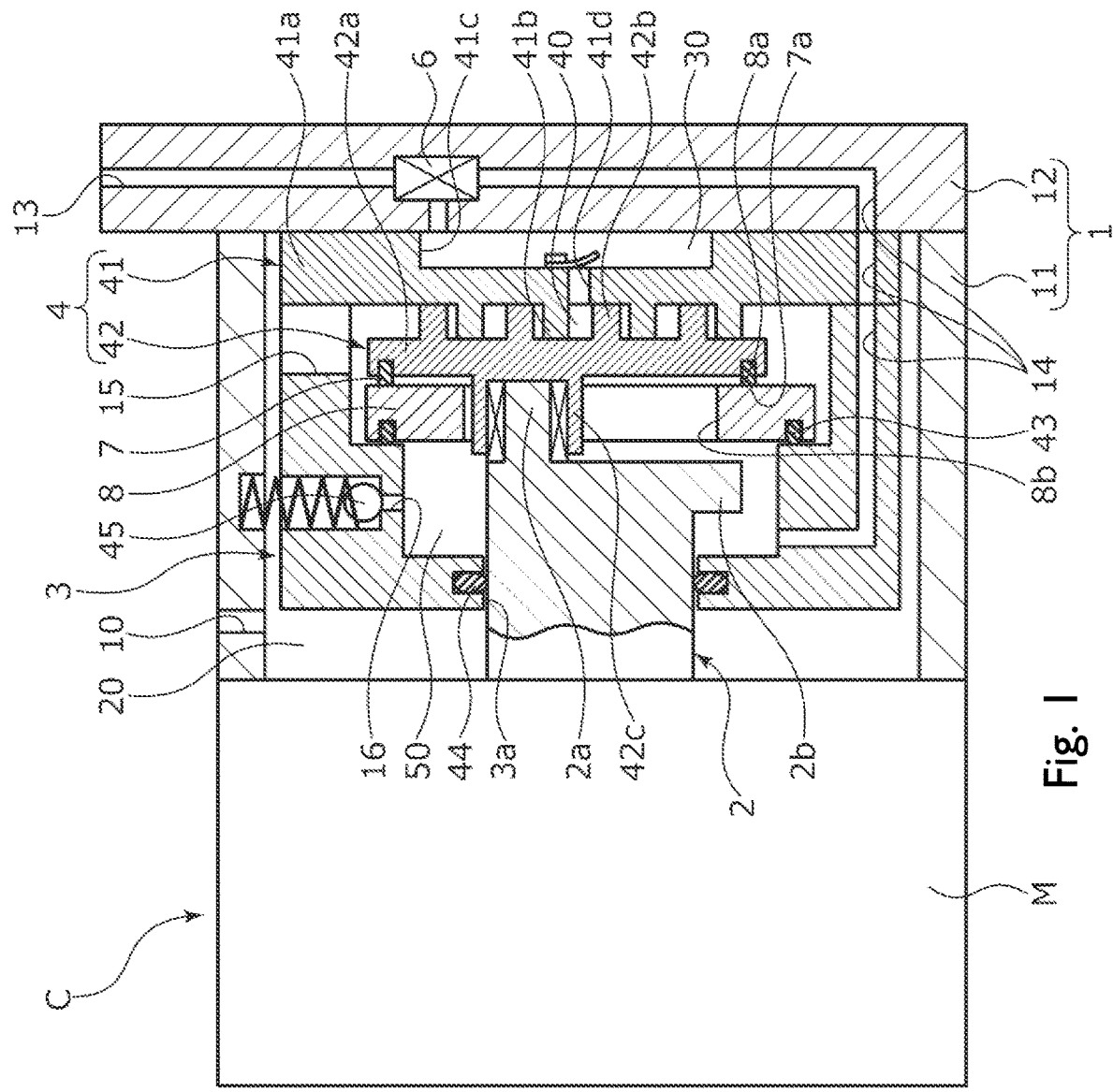
FIG. 1 is a schematic configuration diagram illustrating a scroll compressor to which a side seal as a sliding component according to a first embodiment of the present invention is applied.

Modes for implementing the sliding component according to the present invention will be described below based on embodiments.

First Embodiment

The sliding component according to a first embodiment of the present invention will be described with reference to FIGS. 1 to 8. In the drawings, the groove formed in the sliding surface of the sliding component or the like is dotted for convenience of description.

The sliding component according to the first embodiment of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking one opening of the casing 11. Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50. It should be noted that the back pressure chamber 50 is formed in the cylindrical inner casing 3 accommodated in the casing 11.

Formed in the cover 12 is a discharge communication passage 13 for communication between the refrigerant circuit (not illustrated) and the high-pressure chamber 30. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with one end of the inner casing 3 abutting against an end plate 41a of a fixed scroll 41 constituting the scroll compression mechanism 4. In addition, in one end portion of the inner casing 3, a suction communication passage 15 penetrating it in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a substantially sealed shape. The movable scroll 42 is accommodated in the inner casing 3.

The fixed scroll 41 is made of metal and includes a spiral lap 41b projecting from the surface of the disk-shaped end plate 41a, that is, one end surface of the end plate 41a. In addition, a recessed portion 41c recessed on the inner diameter side of the back surface of the end plate 41a, that is, the other end surface of the end plate 41a is formed in the fixed scroll 41. The high-pressure chamber 30 is defined from the recessed portion 41c and the end surface of the cover 12.

The movable scroll 42 is made of metal and includes a spiral lap 42b projecting from the surface of a disk-shaped end plate 42a, that is, one end surface of the end plate 42a. In addition, a boss 42c protruding from the middle of the back surface of the end plate 42a, that is, the other end surface of the end plate 42a is formed on the movable scroll 42. An eccentric portion 2a formed in one end portion of the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from one end portion of the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction. A compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
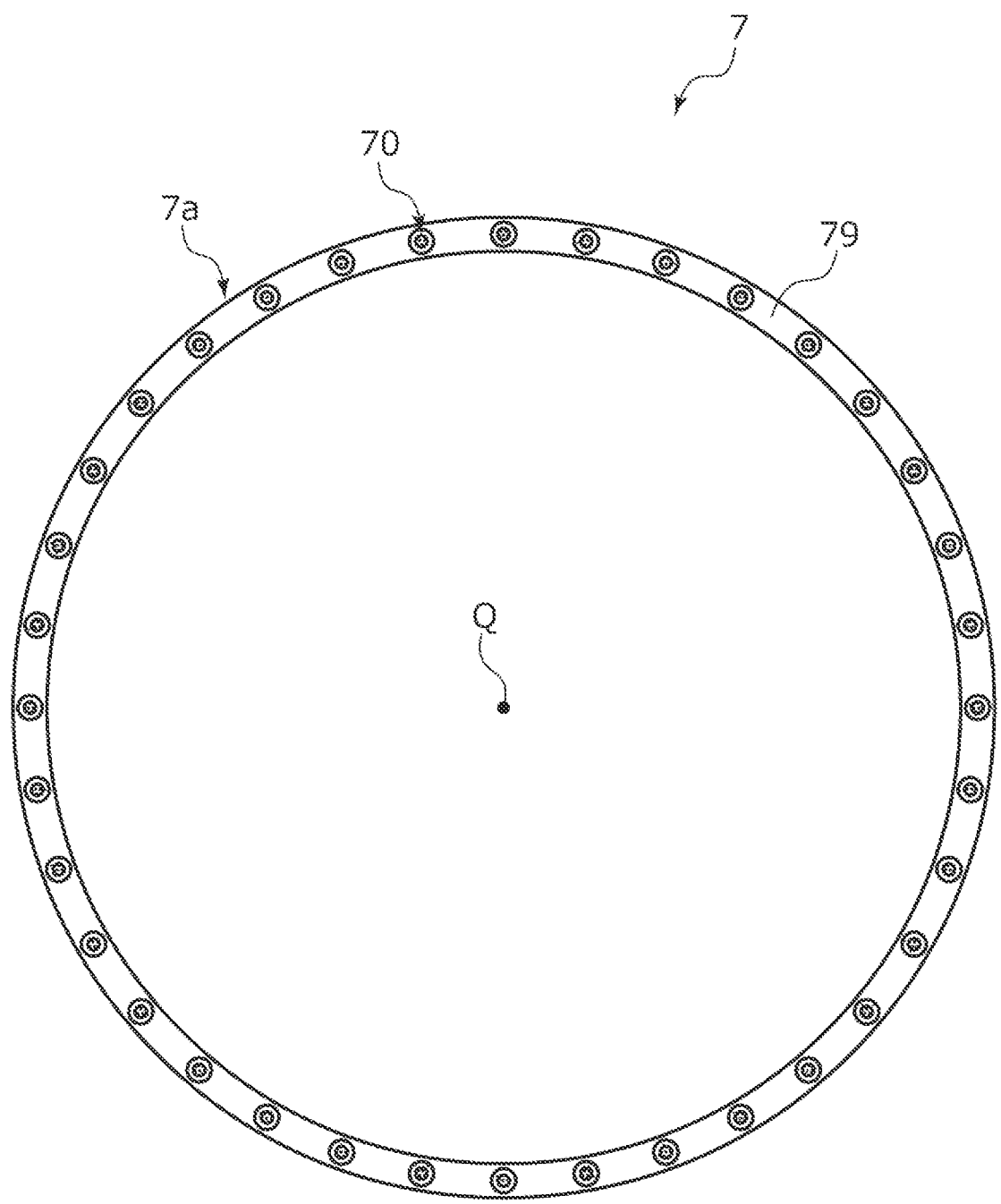
FIG. 2 is a diagram illustrating a sliding surface of the side seal in the first embodiment of the present invention.
Figure 3A:
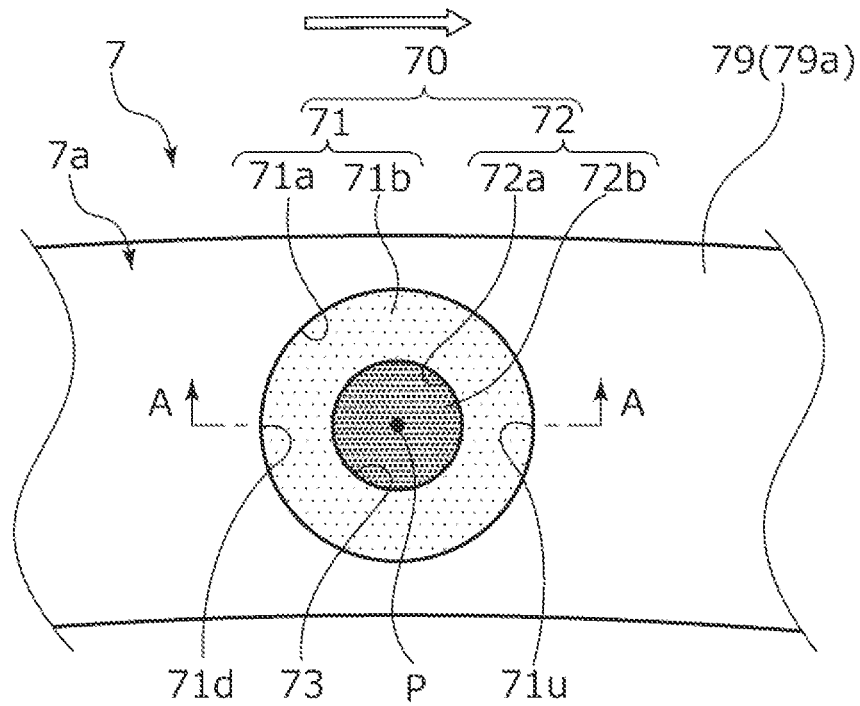
FIG. 3A is a partially enlarged view illustrating a dynamic pressure generation mechanism on the sliding surface in the first embodiment.

Next, the side seal 7 as a sliding component in the present embodiment will be described. As illustrated in FIGS. 2 and 3, the side seal 7 is made of resin and has a rectangular cross section and an annular shape in an axial view. The side seal 7 is fixed to the back surface of the end plate 42a of the movable scroll 42 (see FIG. 1). It should be noted that a sliding surface 7a of the side seal 7 is illustrated in FIGS. 2 and 3A.

The sliding surface 7a abutting against a sliding surface 8a of the thrust plate 8 is formed on one side surface of the side seal 7.

As illustrated in FIG. 2, the sliding surface 7a of the side seal 7 includes a land 79 and a plurality of dynamic pressure generation mechanisms 70. The dynamic pressure generation mechanisms 70 are substantially equally arranged in the circumferential direction of the sliding surface 7a.

As illustrated in FIG. 3, the dynamic pressure generation mechanism 70 includes a shallow groove portion 71 having an annular shape in an axial view and a deep groove portion 72 having a circular shape in an axial view. In FIG. 3A, the shallow groove portion 71 is indicated by coarse dots and the deep groove portion 72 is indicated by fine dots.

Figure 3B:
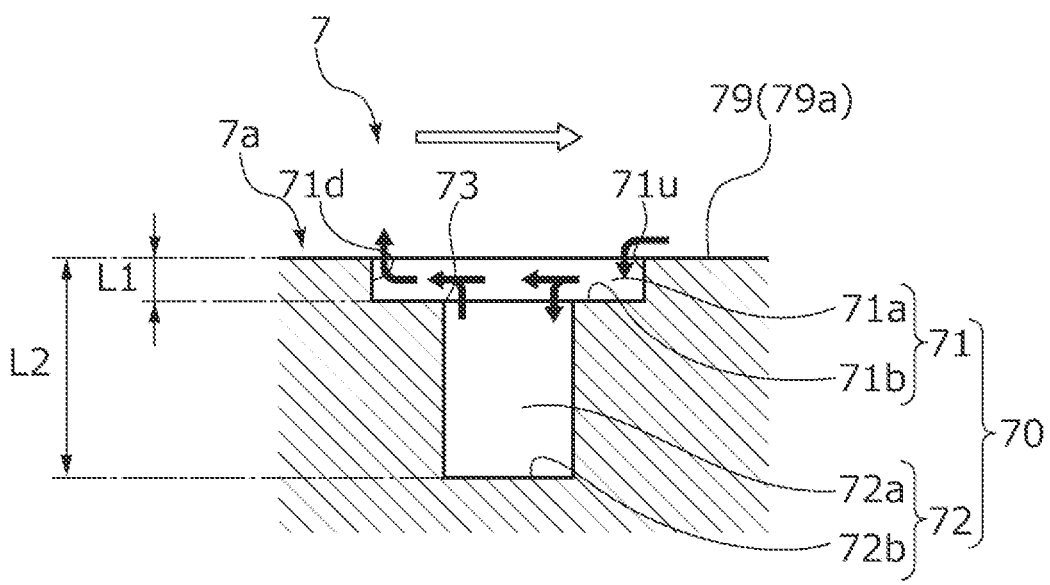
FIG. 3B is a cross-sectional view taken along line A-A in FIG. 3A.

As illustrated in FIG. 3B, the shallow groove portion 71 is formed of a wall surface 71a and a bottom surface 71b. The wall surface 71a extends in a cylindrical shape in the depth direction of the shallow groove portion 71 substantially orthogonal to a flat surface 79a of the land 79. The bottom surface 71b extends substantially orthogonal to the end portion of the wall surface 71a and substantially parallel to the surface 79a of the land 79 and is annular and flat.

The deep groove portion 72 is formed of a wall surface 72a and a bottom surface 72b. The wall surface 72a extends in a cylindrical shape in the depth direction of the deep groove portion 72 substantially orthogonal to the inner diameter-side end portion of the bottom surface 71b of the shallow groove portion 71. The bottom surface 72b extends substantially orthogonal to the end portion of the wall surface 72a and substantially parallel to the surface 79a of the land 79 and is circular and flat.

In other words, the deep groove portion 72 is formed in the radial middle portion of the shallow groove portion 71. The wall surface 71a is the outer contour of the shallow groove portion 71. The wall surface 72a is the outer contour of the deep groove portion 72. Both the wall surface 71a and the wall surface 72a are formed concentrically in an axial view with a point P at the center, and the shallow groove portion 71 communicates with the deep groove portion 72 over a range of 360 degrees (see FIG. 3A).

In addition, a depth dimension L1 of the shallow groove portion 71 is a dimension from the surface 79a of the land 79 to the bottom surface 71b of the shallow groove portion 71. A depth dimension L2 of the deep groove portion 72 is a dimension from the end surface of the land 79 to the bottom surface 72b of the deep groove portion 72. The depth dimension L1 of the shallow groove portion 71 is shallower than the depth dimension L2 of the deep groove portion 72 (L1<L2).

It should be noted that the depth dimensions of the shallow groove portion 71 and the deep groove portion 72 can be freely changed insofar as the depth dimension L2 of the deep groove portion 72 is formed deeper than the depth dimension L1 of the shallow groove portion 71. In addition, from the viewpoint of fluid supply from the deep groove portion 72 to the shallow groove portion 71, which will be described later, it is preferable that the dimensional difference between the depth dimension L1 and the depth dimension L2 is 10 times or more.

In addition, in the dynamic pressure generation mechanism 70, a step 73 is formed by the bottom surface 71b of the shallow groove portion 71 and the wall surface 72a of the deep groove portion 72. The angle between the bottom surface 71b of the shallow groove portion 71 and the wall surface 72a of the deep groove portion 72 in the step 73 is approximately 90 degrees.

Referring to FIG. 1, the thrust plate 8 is made of metal and has an annular shape. A seal ring 43 is fixed to one end surface of the thrust plate 8. The seal ring 43 abuts against the inside surface of the inner casing 3. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed section formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the high-pressure chamber 30 and the back pressure chamber 50 communicate with each other by means of the back pressure communication passage 14. The back pressure communication passage 14 is formed over the cover 12, the fixed scroll 41, and the inner casing 3 and is provided with an orifice (not illustrated). After depressurization adjustment by means of the orifice, the refrigerant in the high-pressure chamber 30 is supplied to the back pressure chamber 50 together with the lubricating oil separated by the oil separator 6. As a result, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other and a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 4).

Figure 4A:
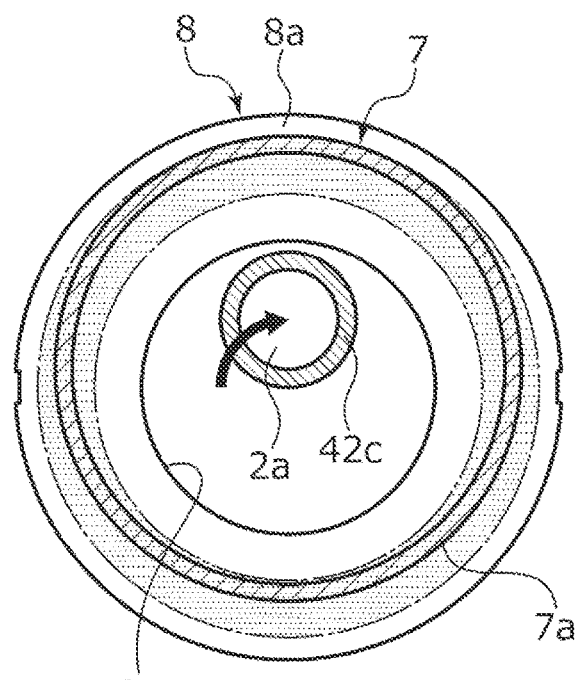
FIG. 4 is a diagram illustrating relative sliding between the sliding surface of the side seal and a sliding surface of a thrust plate in the first embodiment of the present invention. It should be noted that FIG. 4A illustrates the start position of the relative sliding
FIGS. 4B to 4D illustrate the positional relationships between the relatively sliding surfaces of the side seal and the thrust plate at an eccentric rotary shaft rotation of 90, 180, and 270 degrees, respectively.
Figure 4B:
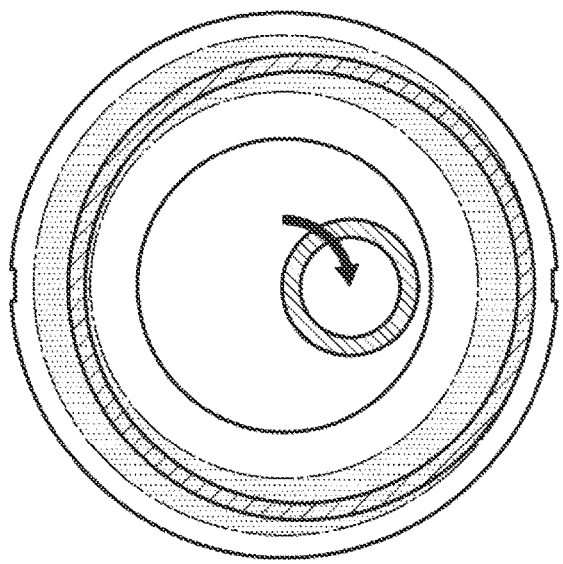
Figure 4C:
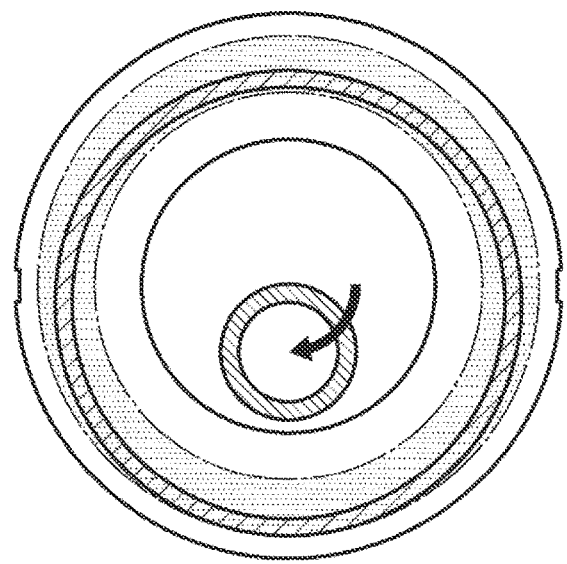
Figure 4D:
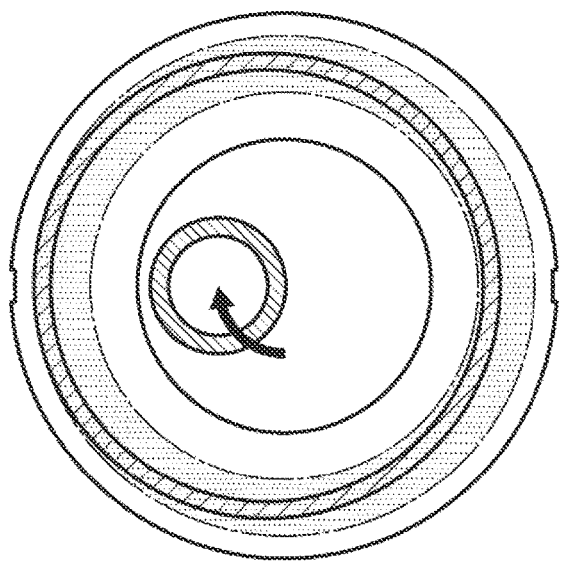

It should be noted that FIGS. 4A to 4D in FIG. 4 illustrate the rotational trajectory of the boss 42c that is viewed from the fixed scroll 41 (see FIG. 1) side and indicated by the black arrows. Respectively illustrated in FIGS. 4B to 4D are the boss 42c rotated by 90 degrees, 180 degrees, and 270 degrees with FIG. 4A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Next, dynamic pressure generation during the sliding of the side seal 7 relative to the thrust plate 8 will be described with reference to FIGS. 3 and 5 to 8. It should be noted that a fluid containing, for example, a refrigerant and lubricating oil is stored in the dynamic pressure generation mechanism 70 even when the rotation is stopped. In addition, the side seal 7 that is viewed from the drive motor M (see FIG. 1) side is illustrated in each of FIGS. 5 to 8 and the circle mark on the wall surface 71a of the dynamic pressure generation mechanism 70 indicates the point where the pressure is highest in each dynamic pressure generation mechanism 70.

As illustrated in FIG. 3, when the side seal 7 slides relative to the thrust plate 8 (see FIG. 1), in a case where the side seal 7 moves in the direction indicated by the white arrow, the fluid in the dynamic pressure generation mechanism 70 receives a shear force in the direction indicated by the black arrow (see FIG. 3B), which is substantially opposite in direction to the white arrow, and moves in that direction. It should be noted that the black arrow indicating the direction in which the fluid flows is illustrated only in FIG. 3B.

As a result, the pressure of the fluid increases at a part 71d downstream of the deep groove portion 72 of the shallow groove portion 71, and a positive dynamic pressure is generated. It should be noted that in the following description, positive dynamic pressure may be simply described as dynamic pressure.

In addition, at a part 71u upstream of the deep groove portion 72 of the shallow groove portion 71, the fluid moves toward the part 71d downstream of the deep groove portion 72 of the shallow groove portion 71. In the deep groove portion 72, a large amount of fluid is stored, and thus negative pressure is slightly generated or is not generated at the part 71u without a sharp decrease in the fluid at the part 71u.

As a result of the dynamic pressure generation, the sliding surfaces 7a and 8a are slightly separated from each other and a fluid film is formed by the fluid flowing in between the sliding surfaces 7a and 8a. As a result, the lubricity between the sliding surfaces 7a and 8a is improved, and thus the frictional resistance between the sliding surfaces 7a and 8a during sliding decreases. At this time, local negative pressure generation is unlikely in the shallow groove portion 71 as described above, and thus cavitation is unlikely to occur with the dynamic pressure generation.

Figure 5:
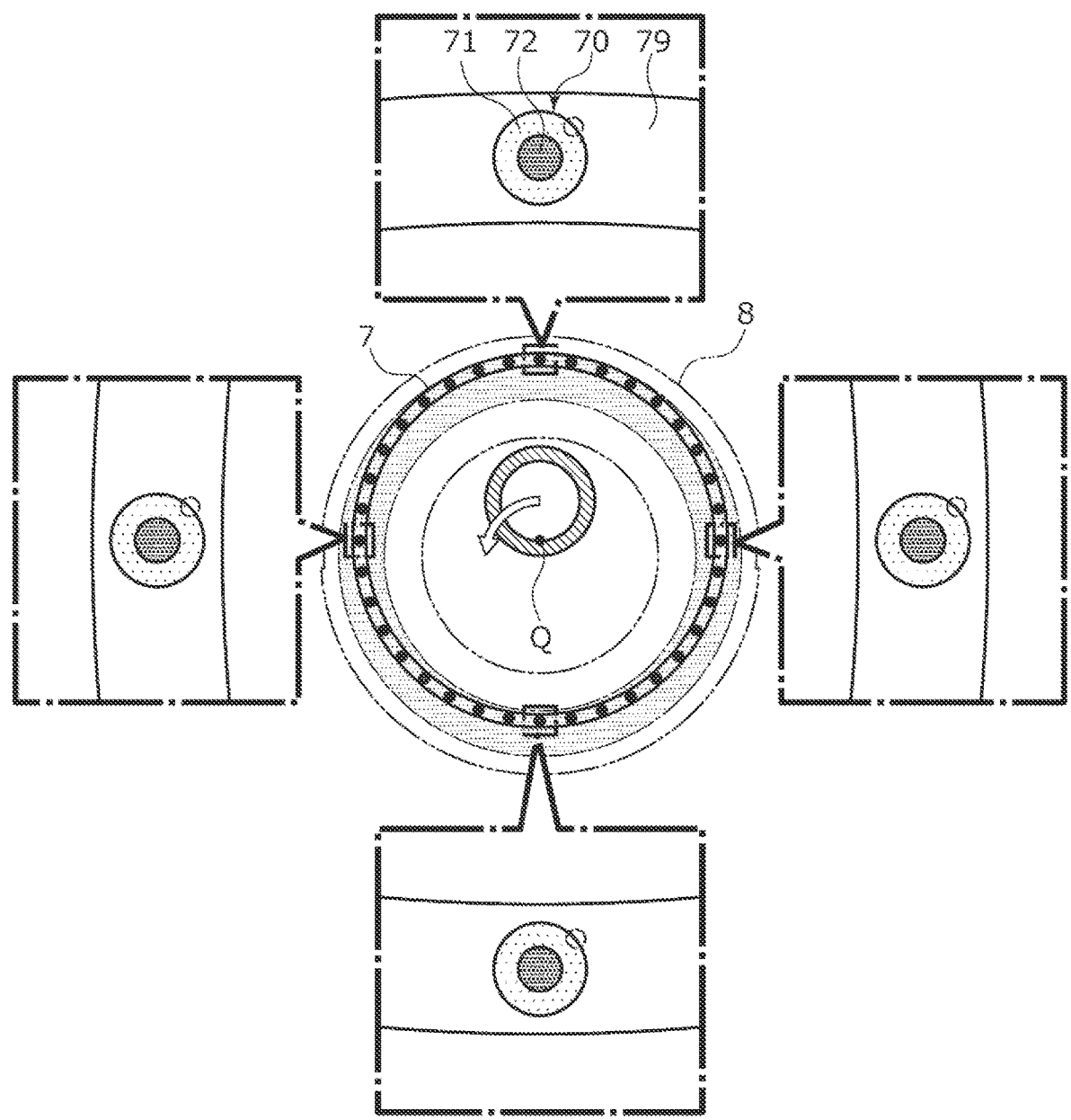
FIG. 5 is a diagram illustrating the distribution of the pressure generated in a plurality of grooves as a result of the relative movement of the groove entailed by the eccentric rotary shaft rotation in the sliding surface of the side seal illustrated in FIG. 4A.

Next, dynamic pressure generation over the entire side seal 7 will be described. Referring to FIG. 5, when the side seal 7 is to move from the rotational state of FIG. 4A to the rotational state of FIG. 4B as indicated by the white arrow, the fluid moves relative to the white arrow in the opposite direction. In each dynamic pressure generation mechanism 70, the fluid in the shallow groove portion 71 moves toward the region on the upper right side of the wall surface 71a and dynamic pressure is generated.

Figure 6:
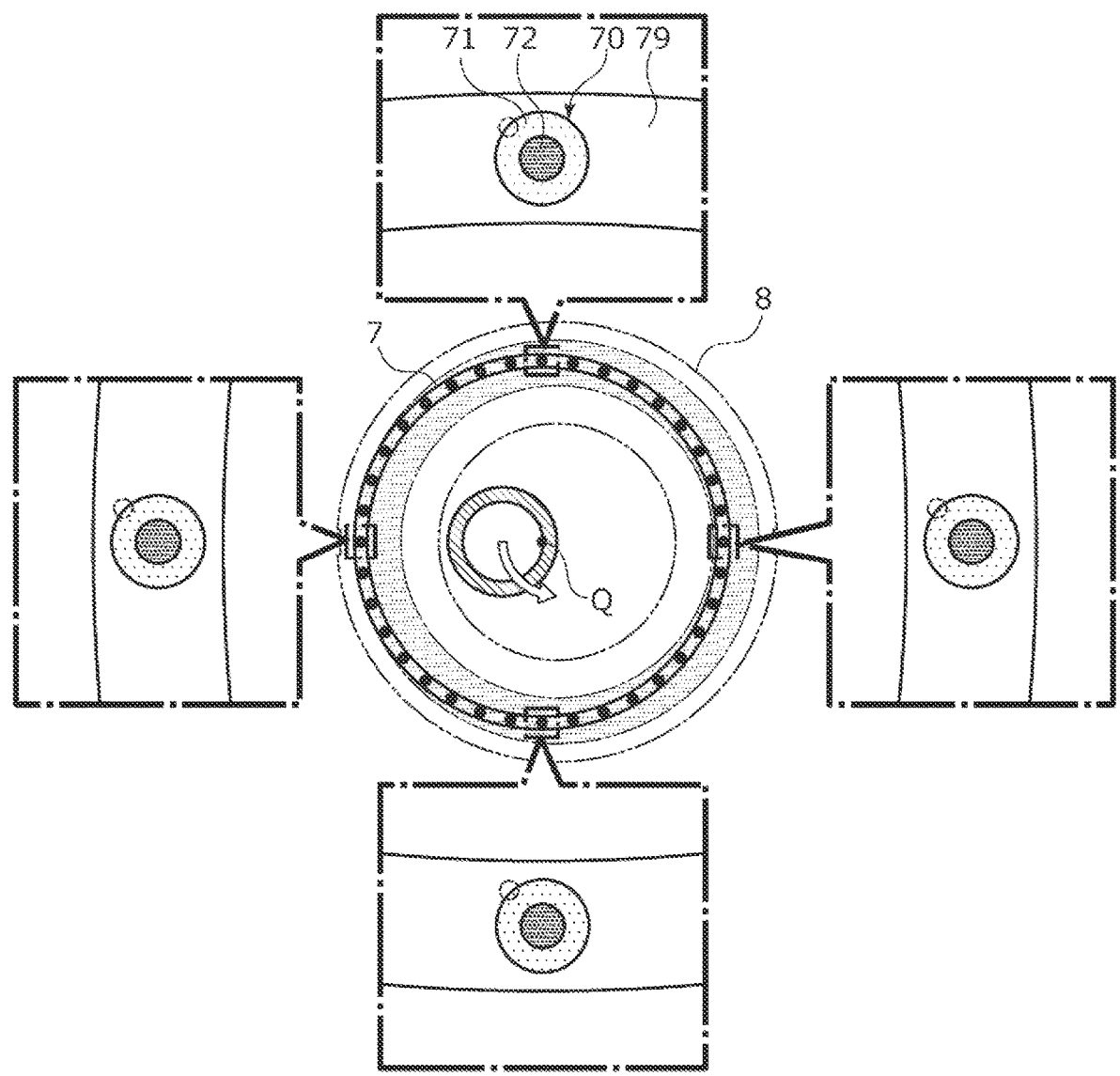
FIG. 6 is a diagram illustrating the distribution of the pressure generated in the plurality of grooves as a result of the relative movement of the groove entailed by the eccentric rotary shaft rotation in the sliding surface of the side seal illustrated in FIG. 4B.

In addition, referring to FIG. 6, when the side seal 7 is to move from the rotational state of FIG. 4B to the rotational state of FIG. 4C as indicated by the white arrow, the fluid moves relative to the white arrow in the opposite direction. In each dynamic pressure generation mechanism 70, the fluid in the shallow groove portion 71 moves toward the region on the upper left side of the wall surface 71a and dynamic pressure is generated.

Figure 7:
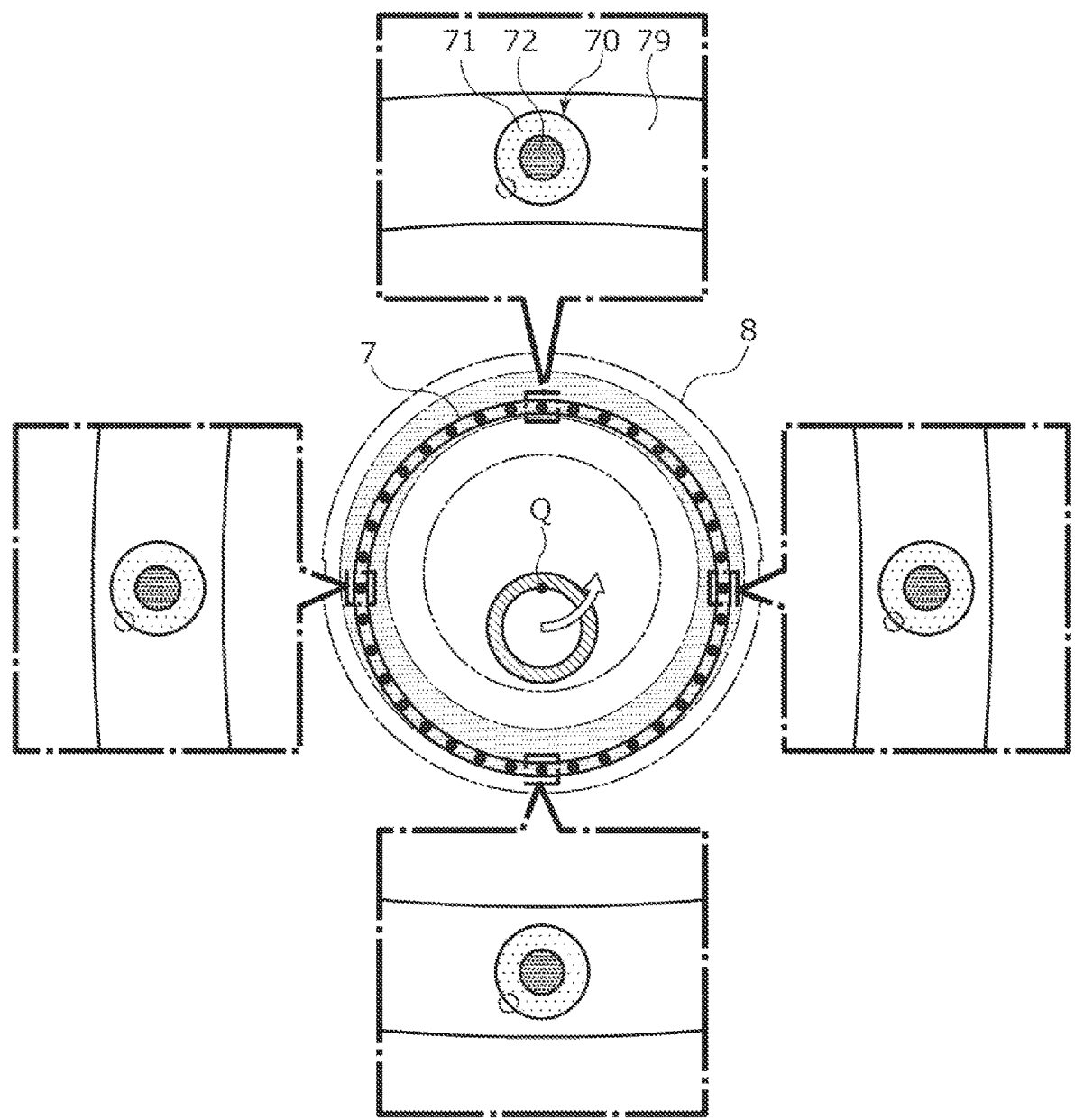
FIG. 7 is a diagram illustrating the distribution of the pressure generated in the plurality of grooves as a result of the relative movement of the groove entailed by the eccentric rotary shaft rotation in the sliding surface of the side seal illustrated in FIG. 4C.

In addition, referring to FIG. 7, when the side seal 7 is to move from the rotational state of FIG. 4C to the rotational state of FIG. 4D as indicated by the white arrow, the fluid moves relative to the white arrow in the opposite direction. In each dynamic pressure generation mechanism 70, the fluid in the shallow groove portion 71 moves toward the region on the lower left side of the wall surface 71a and dynamic pressure is generated.

Figure 8:
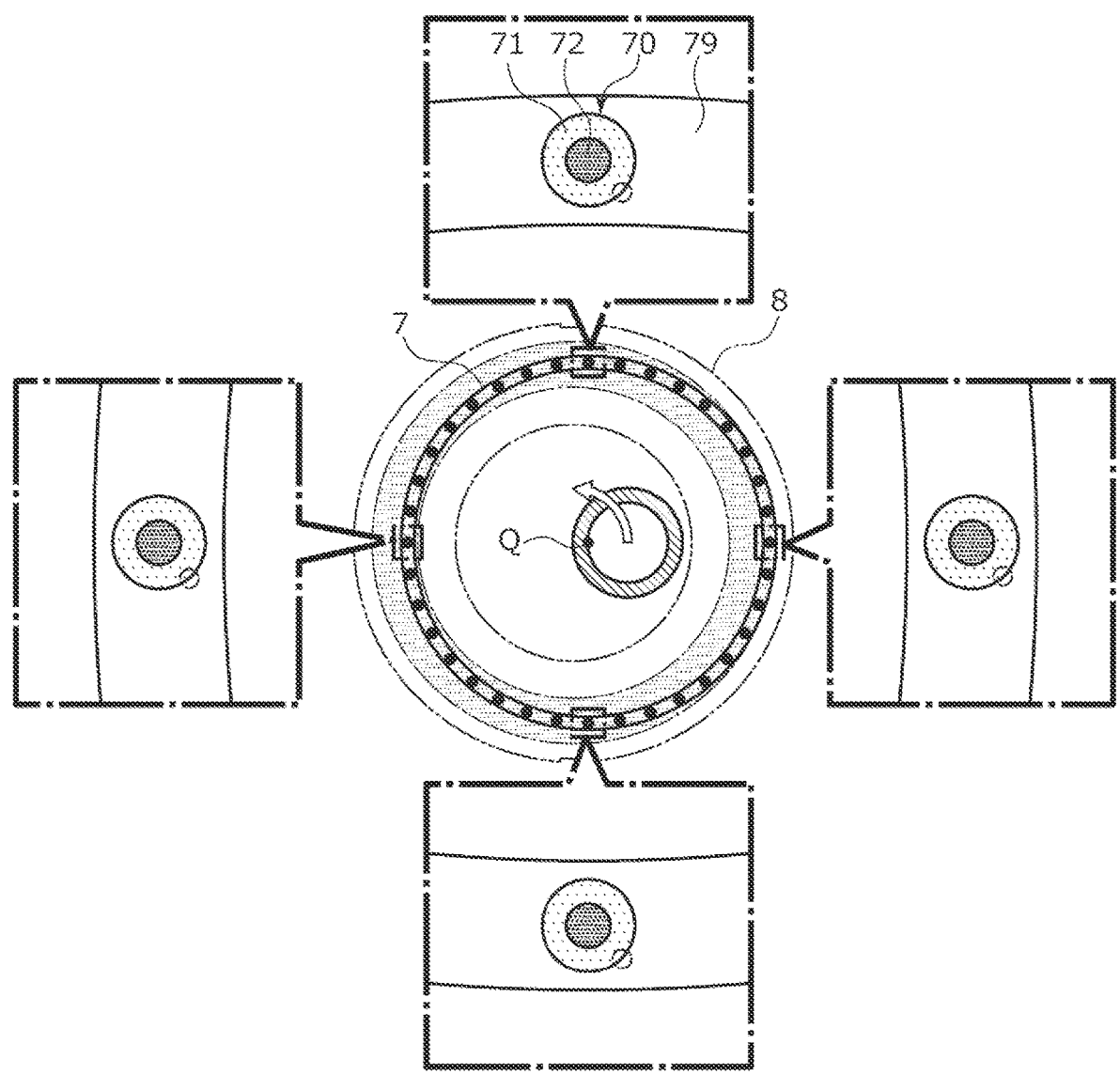
FIG. 8 is a diagram illustrating the distribution of the pressure generated in the plurality of grooves as a result of the relative movement of the groove entailed by the eccentric rotary shaft rotation in the sliding surface of the side seal illustrated in FIG. 4D.

In addition, referring to FIG. 8, when the side seal 7 is to move from the rotational state of FIG. 4D to the rotational state of FIG. 4A as indicated by the white arrow, the fluid moves relative to the white arrow in the opposite direction. In each dynamic pressure generation mechanism 70, the fluid in the shallow groove portion 71 moves toward the region on the lower right side of the wall surface 71a and dynamic pressure is generated.

As described above, in the dynamic pressure generation mechanism 70, the wall surface 71a of the shallow groove portion 71 is formed in an annular shape in an axial view. Accordingly, in each dynamic pressure generation mechanism 70, the point of the pressure generated on the wall surface 71a gradually moves along the wall surface 71a in accordance with the rotation angle of the boss 42c (see FIGS. 5 to 8).

At this time, regardless of the eccentric rotation angle, that is, the eccentric rotation phase in each shallow groove portion 71, the angles of the points where the dynamic pressure is generated in the respective shallow groove portions 71 are substantially the same. Accordingly, the points where the dynamic pressure is generated are equidistantly scattered in a substantially circumferential direction over the sliding surface 7a of the side seal 7. As a result, it is easy to maintain a state where the sliding surfaces 7a and 8a are parallel to each other.

In addition, in the dynamic pressure generation mechanism 70, the wall surface 71a of the shallow groove portion 71 is continuous with the same radius of curvature, and thus the pressure generated in each shallow groove portion 71 is substantially the same regardless of the eccentric rotation angle. As a result, the dynamic pressure generated in each shallow groove portion 71 between the sliding surfaces 7a and 8a is unlikely to change sharply, and the generated dynamic pressure can be stabilized.

In addition, the points where the dynamic pressure is generated between the sliding surfaces 7a and 8a are scattered in a substantially circumferential direction over the sliding surface 7a of the side seal 7, and thus it is easy to maintain the parallelism between the sliding surfaces 7a and 8a regardless of the eccentric rotation angle.

In addition, in each dynamic pressure generation mechanism 70, the point of the pressure generated on the wall surface 71a gradually moves along the wall surface 71a in accordance with the rotation angle of the boss 42c (see FIGS. 5 to 8). Accordingly, the fluid flowing out of the dynamic pressure generation mechanism 70 upstream in the circumferential direction between the sliding surfaces 7a and 8a with the generation of the dynamic pressure is likely to flow into the dynamic pressure generation mechanism 70 adjacent on the downstream side at that time. Accordingly, not only is it easy for a fluid film to be formed by the fluid over the circumferential direction between the sliding surfaces 7a and 8a, but also the fluid on the land 79 is likely to be supplied into the dynamic pressure generation mechanism 70 (see FIG. 3B).

In addition, in the dynamic pressure generation mechanism 70, the fluid in the deep groove portion 72 moves into the shallow groove portion 71 as the fluid in the shallow groove portion 71 moves (see FIG. 3B). As a result, dynamic pressure is generated in the shallow groove portion 71 and, even in the event of fluid outflow from the shallow groove portion 71 to the land 79, the fluid stored in the deep groove portion 72 is supplied into the shallow groove portion 71. Accordingly, dynamic pressure can be reliably generated in the shallow groove portion 71.

In addition, in the dynamic pressure generation mechanism 70, the deep groove portion 72 is formed concentrically with the shallow groove portion 71 and continuously communicates with the shallow groove portion 71 over a range of 360 degrees, that is, over the entire circumferential direction, and the wall surface 72a of the deep groove portion 72 is formed in an annular shape in an axial view and continuous with the same radius of curvature. Accordingly, a fluid is smoothly supplied to the shallow groove portion 71 no matter where dynamic pressure is generated in the shallow groove portion 71.

In addition, as for the dynamic pressure generation mechanism 70, the shallow groove portion 71 and the deep groove portion 72 are partitioned by the step 73, and thus a large volume can be formed in the deep groove portion 72. For example, in the configuration of a comparative example with a tapered surface that decreases in radius of curvature with an increase in depth with at least the bottom surface of a shallow groove portion and the wall surface of a deep groove portion continuous in a flat shape, that is, a configuration in which shallow and deep groove portions are not partitioned by a step, the internal volume of the deep groove portion is small. In this manner, the amount of fluid that can be stored in the deep groove portion 72 can be increased, and thus a fluid can be reliably supplied into the shallow groove portion 71 and it is possible to reliably suppress the occurrence of cavitation while generating dynamic pressure.

In addition, the wall surface 72a of the deep groove portion 72 has a continuous shape with the same radius of curvature with the point P at the center, and thus a sufficient fluid can be ensured and the fluid can be stably supplied into the shallow groove portion 71. For example, in the shape of a comparative example in which the radius of curvature of a wall surface decreases toward a bottom surface, the amount of fluid that can be stored decreases.

It should be noted that various cross-sectional shapes may be given to the deep groove portion and, in one example thereof, the radius of curvature of a wall surface may increase toward a bottom surface.

In addition, as for the side seal 7, the depth dimension L2 of the deep groove portion 72 is 10 times or more the depth dimension L1 of the shallow groove portion 71, and thus a large amount of fluid can be stored in the deep groove portion 72.

As described above, in the side seal 7, the fluid stored in the deep groove portion 72 is stably supplied into the shallow groove portion 71 communicating with the deep groove portion 72 in accordance with the direction of the relative movement of the shallow groove portion 71 entailed by eccentric rotation. Accordingly, by generating dynamic pressure in the shallow groove portion 71 to slightly separate the sliding surfaces 7a and 8a from each other and form a fluid film, not only can the lubricity between the sliding surfaces 7a and 8a be improved, but also the occurrence of cavitation can be suppressed. In this manner, the frictional resistance of the sliding surfaces 7a and 8a during sliding can be stably reduced.

Second Embodiment

Next, a dynamic pressure generation mechanism 170 of a side seal 107 of a sliding component according to a second embodiment of the present invention will be described with reference to FIG. 9. It should be noted that the description of configurations identical to those of the first embodiment will be omitted for redundancy avoidance.

Figure 9:
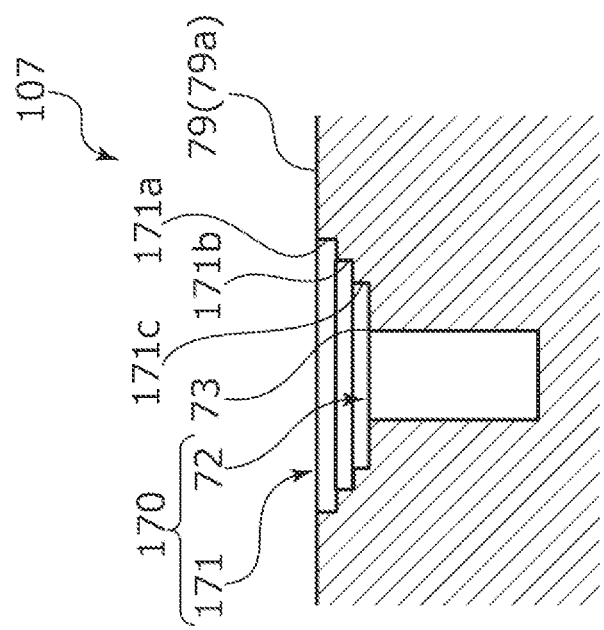
FIG. 9 is a cross-sectional view illustrating a dynamic pressure generation mechanism of a sliding component according to a second embodiment of the present invention.

As illustrated in FIG. 9, a shallow groove portion 171 of the dynamic pressure generation mechanism 170 is formed in a stepped tapered shape in a cross-sectional view that deepens from the land 79 toward the deep groove portion 72. As a result, a fluid easily moves toward the land 79 from the deep groove portion 72 side of the shallow groove portion 171. Accordingly, it is easy to generate dynamic pressure in the shallow groove portion 171 and, in addition, a fluid is easily supplied from the deep groove portion 72 on the upstream side in the shallow groove portion 171 at a time when the point where dynamic pressure is generated in the shallow groove portion 171 is the downstream side. In other words, no local negative pressure is generated as compared with the first embodiment, and the occurrence of cavitation can be suppressed.

In addition, at a low speed, a fluid collides with a wall surface 171a on the outermost diameter side and dynamic pressure is generated. At a medium speed, dynamic pressure is generated by a fluid colliding with a wall surface 171b between the wall surface 171a and a wall surface 171c in addition to the wall surface 171a. At a high speed, a fluid collides with the wall surface 171a, the wall surface 171b, and the wall surface 171c on the innermost diameter side and dynamic pressure is generated. Accordingly, dynamic pressure can be effectively obtained in a wide speed range.

Third Embodiment

Next, a dynamic pressure generation mechanism 270 of a side seal 207 of a sliding component according to a third embodiment of the present invention will be described with reference to FIG. 10. It should be noted that the description of configurations identical to those of the first embodiment will be omitted for redundancy avoidance.

Figure 10:
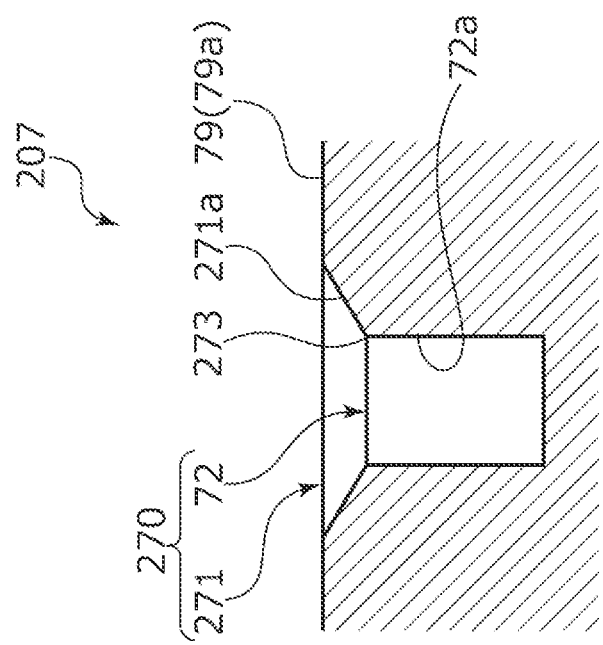
FIG. 10 is a cross-sectional view illustrating a dynamic pressure generation mechanism of a sliding component according to a third embodiment of the present invention.

As illustrated in FIG. 10, a shallow groove portion 271 of the dynamic pressure generation mechanism 270 is formed in a planar tapered shape in a cross-sectional view that deepens from the end portion on the land 79 side toward the deep groove portion 72. As a result, a fluid easily moves from the deep groove portion 72 side of the shallow groove portion 271 toward the land 79 along a tapered surface 271a of the shallow groove portion 271. Accordingly, it is easy to generate dynamic pressure in the shallow groove portion 271 and, in addition, a fluid is easily supplied from the deep groove portion 72 on the upstream side in the shallow groove portion 271 at a time when the point where dynamic pressure is generated in the shallow groove portion 271 is the downstream side. In other words, no local negative pressure is generated as compared with the first embodiment, and the occurrence of cavitation can be suppressed.

In addition, the range of dynamic pressure generation changes along the tapered surface 271a of the shallow groove portion 271 in accordance with the rotation speed of the sliding component. More specifically, as the speed increases, the range of dynamic pressure generation increases from the land 79 side of the tapered surface 271a toward the inner diameter side of the shallow groove portion 271. Accordingly, dynamic pressure can be effectively obtained in a wide speed range.

In addition, in the dynamic pressure generation mechanism 270, a step 273 is formed by the tapered surface 271a of the shallow groove portion 271 and the wall surface 72a of the deep groove portion 72. The tapered surface 271a and the surface 79a of the land 79 form an obtuse angle. The angle of the step 273 is also an obtuse angle, that is, the tapered surface 271a and the wall surface 72a of the deep groove portion 72 form an obtuse angle. The surface 79a of the land 79 and the wall surface 72a of the deep groove portion 72 are substantially orthogonal to each other. As a result, the shallow groove portion 271 and the deep groove portion 72 are partitioned by the step 273, and thus the amount of fluid that can be stored in the deep groove portion 72 can be increased. Accordingly, a fluid can be reliably supplied into the shallow groove portion 271 and it is possible to reliably suppress the occurrence of cavitation while generating dynamic pressure.

Fourth Embodiment

Next, a dynamic pressure generation mechanism 370 of a side seal 307 of a sliding component according to a fourth embodiment of the present invention will be described with reference to FIG. 11. It should be noted that the description of configurations identical to those of the first embodiment will be omitted for redundancy avoidance.

Figure 11:
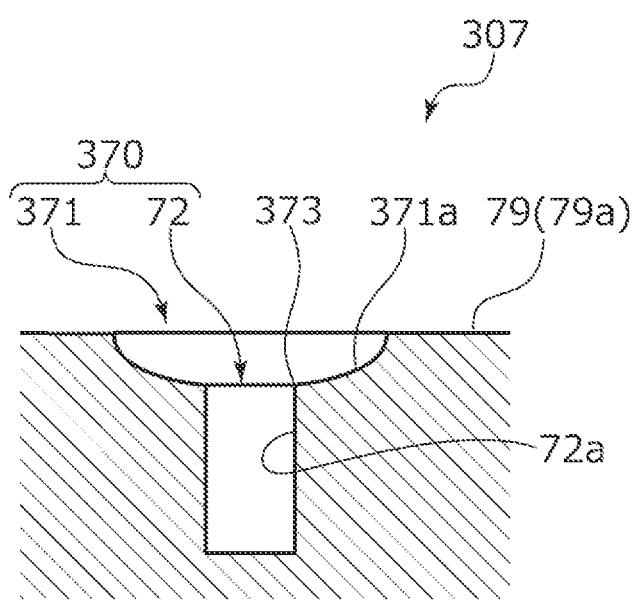
FIG. 11 is a cross-sectional view illustrating a dynamic pressure generation mechanism of a sliding component according to a fourth embodiment of the present invention.

As illustrated in FIG. 11, a shallow groove portion 371 of the dynamic pressure generation mechanism 370 is formed in a round tapered shape in a cross-sectional view that deepens from the end portion on the land 79 side toward the deep groove portion 72. As a result, after moving along a tapered surface 371a of the shallow groove portion 371, a fluid is guided to the sliding surface 8a side facing in the end portion on the land 79 side, and thus the efficiency of sliding component separation from the sliding surface 8a is satisfactory.

In addition, the range of dynamic pressure generation changes along the tapered surface 371a of the shallow groove portion 371 in accordance with the rotation speed of the sliding component. More specifically, as the speed increases, the range of dynamic pressure generation increases from the land 79 side of the tapered surface 371a toward the inner diameter side of the shallow groove portion 371. Accordingly, dynamic pressure can be effectively obtained in a wide speed range. On the land 79 side of the tapered surface 371a in particular, the shallow groove portion 371 rapidly decreases in depth as the land 79 is approached, and thus dynamic pressure can be generated in a wide speed range in the vicinity of the land 79.

In addition, in the dynamic pressure generation mechanism 370, a step 373 is formed by the tapered surface 371a of the shallow groove portion 371 and the wall surface 72a of the deep groove portion 72, the angle between the tapered surface 371a of the shallow groove portion 371 and the wall surface 72a of the deep groove portion 72 in the step 373 is approximately 90 degrees, and the surface 79a of the land 79 and the wall surface 72a of the deep groove portion 72 are substantially orthogonal to each other. As a result, the shallow groove portion 371 and the deep groove portion 72 are partitioned by the step 373, and thus the amount of fluid that can be stored in the deep groove portion 72 can be increased. Accordingly, a fluid can be reliably supplied into the shallow groove portion 71 and it is possible to reliably suppress the occurrence of cavitation while generating dynamic pressure.

Although embodiments of the present invention have been described above with reference to the drawings, the specific configurations are not limited to the embodiments and any changes or additions within the scope of the present invention are included in the present invention.

Although an aspect in which a side seal as a sliding component is applied to a scroll compressor used in the air conditioning system of an automobile or the like has been described in the embodiments, the present invention is not limited thereto and the side seal as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, insofar as the sliding component of the present invention has a sliding surface that relatively slides with eccentric rotation, the sliding component of the present invention may be used in an environment in which the pressure inside the sliding surface and the pressure outside the sliding surface are substantially equal to each other without being limited to an environment in which there is a pressure difference between the inside and outside of the sliding surface. In addition, the sliding component of the present invention does not have to function as a seal and may be one capable of stably reducing the frictional resistance of a sliding surface.

In addition, although the side seal having the relatively sliding surface is made of resin and the thrust plate is made of metal in the embodiments, the material of the sliding component may be freely selected in accordance with the environment of use and so on.

In addition, although an aspect in which a dynamic pressure generation mechanism is formed in the sliding surface of the side seal has been described in the embodiments, the present invention is not limited thereto. A groove may be formed in the sliding region of the sliding surface of the thrust plate (see FIG. 4), which is a sliding component having a sliding surface relatively sliding with eccentric rotation. In addition, grooves may be formed in both the sliding surface of the side seal and the sliding surface of the thrust plate.

In addition, although a configuration in which the sliding surface of the side seal as a sliding component and the sliding surface of the thrust plate slide relative to each other with eccentric rotation has been described in the embodiments, the present invention is not limited thereto. A groove may be formed in the sliding surface relatively sliding with eccentric rotation with only one of the side seal and the thrust plate provided. For example, in a case where only the thrust plate is provided, grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In addition, in a case where the side seal and the thrust plate are not provided and the back surface of the end plate of the movable scroll functions as a thrust bearing that abuts against the inner peripheral surface of the inner casing and receives the axial load of the movable scroll, a groove may be formed in the sliding surface formed on the back surface of the end plate of the movable scroll.

In the embodiments, the side seal has been described as a configuration that is annular in an axial view. However, the present invention is not limited thereto and the side seal may be formed in a disk shape in an axial view.

In the embodiments, the dynamic pressure generation mechanism has been described as a configuration in which the wall surface of the deep groove portion is formed concentrically with the wall surface of the shallow groove portion and the deep groove portion communicates with the shallow groove portion over a range of 360 degrees. However, the present invention is not limited thereto. The deep groove portion may have a semicircular or polygonal wall surface and communicate with the shallow groove portion over the circumferential direction. In addition, the deep groove portion and the shallow groove portion have only to communicate with each other at least in part. Accordingly, a configuration in which, for example, partial communication within a range of 360 degrees results from lands scattered between the shallow and deep groove portions may be used.

In the embodiments, the dynamic pressure generation mechanism is configured by one shallow groove portion that is annular in an axial view and one deep groove portion that is circular in an axial view. However, the present invention is not limited thereto. In an alternative configuration, one shallow groove portion that is C-shaped in an axial view may be arranged so as to surround the circumference of one deep groove portion. In another alternative configuration, a plurality of shallow groove portions may be arranged so as to surround the circumference of one deep groove portion. In other words, the term "surrounding" in the present embodiment is not limited to being disposed over a range of 360 degrees and includes configurations that are disposed around substantially evenly or unevenly.

REFERENCE SIGNS LIST

1 Housing
2 Rotary shaft
2a Eccentric portion
3 Inner casing
4 Scroll compression mechanism
6 Oil separator
7 Side seal (sliding component)
7a Sliding surface
8 Thrust plate
8a Sliding surface
10 Suction port
13 Discharge communication passage
14 Back pressure communication passage
15 Suction communication passage
20 Low-pressure chamber
30 High-pressure chamber
40 Compression chamber
41 Fixed scroll
42 Movable scroll
50 Back pressure chamber
70 Dynamic pressure generation mechanism
71 Shallow groove portion
72 Deep groove portion
79 Land
107 Side seal (sliding component)
170 Dynamic pressure generation mechanism
171 Shallow groove portion
207 Side seal (sliding component)
270 Dynamic pressure generation mechanism
271 Shallow groove portion
307 Side seal (sliding component)
370 Dynamic pressure generation mechanism
371 Shallow groove portion
C Scroll compressor
M Drive motor
P Center of dynamic pressure generation mechanism
Q Center of sliding surface

The invention claimed is:

1. An eccentric sliding assembly comprising:
a first sliding component having a sliding surface;
a second sliding component having a sliding surface which is slidable with the sliding surface of the first sliding component; and
an eccentric driving device configured to slide the sliding surface of the first sliding component with the sliding surface of the second sliding component such that a center of the first sliding component imaginarily draws a circle which is eccentric with respect to a center of the second sliding component while keeping non-rotation state of the first sliding component with respect to the center of the first sliding component in a plan view,
the sliding surface of at least one of the first sliding component and the second sliding component includes a land and a plurality of dynamic pressure generation mechanisms arranged in a circumferential direction,
each of the dynamic pressure generation mechanisms includes a shallow groove portion and a deep groove portion deeper than the shallow groove portion,
the shallow groove portion surrounds a circumference of the deep groove portion and communicates with the deep groove portion,
the shallow groove portion surrounds the deep groove portion in an annular shape, and
the shallow groove portion and the deep groove portion are partitioned by a step.

2. The eccentric sliding assembly according to claim 1, wherein the shallow groove portion is formed in an annular shape, the deep groove portion is formed in a circular shape, and the shallow groove portion and the deep groove portion are concentrically formed.

3. The eccentric sliding assembly according to claim 2, wherein a depth of the deep groove portion is 10 times or more a depth of the shallow groove portion.

4. The eccentric sliding assembly according to claim 2, wherein the shallow groove portion is formed shallower on the land side than on the deep groove portion side.

5. The eccentric sliding assembly according to claim 1, wherein a depth of the deep groove portion is 10 times or more a depth of the shallow groove portion.

6. The eccentric sliding assembly according to claim 5, wherein the shallow groove portion is formed shallower on the land side than on the deep groove portion side.

7. The eccentric sliding assembly according to claim 1, wherein the shallow groove portion is formed shallower on the land side than on the deep groove portion side.

* * * * *